United States Patent
Clerx et al.

(10) Patent No.: US 6,513,441 B1
(45) Date of Patent: Feb. 4, 2003

(54) AMUSEMENT DEVICES AS WELL AS A HOLDER SUITABLE FOR SUCH AMUSEMENT DEVICES

(75) Inventors: Petrus Joseph Hubertus Clerx, Roermond (NL); Christiaan Wilhelmus Peeters, Roggel (NL)

(73) Assignee: Vekoma Technology B.V., Vlodrop (NL)

( * ) Notice: Subject to any disclaimer, the term of this patent is extended or adjusted under 35 U.S.C. 154(b) by 0 days.

(21) Appl. No.: 09/530,365

(22) PCT Filed: Oct. 26, 1998

(86) PCT No.: PCT/NL98/00617

§ 371 (c)(1), (2), (4) Date: Jul. 5, 2000

(87) PCT Pub. No.: WO97/22830

PCT Pub. Date: May 14, 1999

(30) Foreign Application Priority Data

Oct. 31, 1997 (NL) .............................................. 1007411

(51) Int. Cl.⁷ ................................................ A63G 7/00
(52) U.S. Cl. .............................. 104/53; 104/63; 104/89
(58) Field of Search ............................. 104/53, 71, 83, 104/111, 63, 93, 89; 297/487, 486, 488, 216.1; 105/148, 150

(56) References Cited

U.S. PATENT DOCUMENTS 5,272,984 A * 12/1993 Bolliger et al. ............... 104/63
5,549,534 A * 8/1996 Parviainen ................... 482/137
5,791,254 A * 8/1998 Mares et al. .................. 104/53
6,004,246 A * 12/1999 Sencil .......................... 482/96
6,086,157 A * 7/2000 Toso ........................... 297/383
6,098,549 A * 8/2000 Mares ........................... 104/76
6,250,717 B1 * 6/2001 Porcheron ................ 297/411.3

FOREIGN PATENT DOCUMENTS

| DE | 33 37 684 A1 | | 4/1983 |
| DE | 36 29 495 A1 | | 3/1987 |
| GB | 2109252 A | * | 5/1983 |
| GB | 2109252 A | * | 6/1983 |
| WO | WO 97/02878 | | 1/1997 |
| WO | WO 9702878 A1 | * | 1/1997 |

* cited by examiner

Primary Examiner—S. Joseph Morano
Assistant Examiner—Frantz F. Jules
(74) Attorney, Agent, or Firm—MacPherson Kwok Chen & Heid LLP

(57) ABSTRACT

An amusement device comprising a guide structure forming an endless track, along which a vehicle capable of accommodating at least one person can travel, whereby a person present in the vehicle extends substantially parallel to the track during operation. The person present in the vehicle lies with his back towards the track and with his face directed away from the track. The person's view is not impeded by other vehicles and he can only see the track itself when the turns his head.

17 Claims, 6 Drawing Sheets

AMUSEMENT DEVICES AS WELL AS A HOLDER SUITABLE FOR SUCH AMUSEMENT DEVICES

FIELD OF THE INVENTION

The invention relates to an amusement device comprising a guide construction forming a track, along which at least one vehicle is movable in a direction of transport, wherein the back of a person present in the vehicle extends substantially parallel to the track in use, which vehicle comprises a holder for said person, which at least comprises a seat support, a back support, a head support, an adjustable shoulder securing part and a leg securing part.

The invention furthermore relates to an amusement device comprising a guide construction forming a track, along which at least one vehicle, in which at least one person can be seated, is movable in a direction of transport, which vehicle comprises a holder for said person, which at least comprises a seat support, a back support, a head support, an adjustable shoulder securing part and a leg securing part.

The invention furthermore relates to a holder which is suitable for such amusement devices.

With a similar amusement device, which is known from International patent application WO97/02878 of the applicant, the person is transported along the track in a position in which he hangs under said track. Said person's back, upper legs and lower legs extend parallel to the track thereby.

Since the person extends in fully stretched position along the track, the distance between two holders arranged one behind the other is partially determined by the length of the tallest person who can be seated in a holder. The persons who use the amusement device vary strongly in length, from a person 1.20 m tall to a relatively tall grown-up of 2.10 m.

Furthermore, the securing of a person in stretched position is relatively complicated.

Another drawback of transporting a person in fully stretched position is the fact that when a number of persons are positioned one behind the other, one person can look between the legs of the person positioned in front of him, which people find embarrassing.

The object of the invention is to provide an amusement device, wherein the person is transported along the track in a comfortable position, whilst the distance between two successive holders can be relatively limited.

SUMMARY OF THE INVENTION

This objective is accomplished with the amusement device according to the invention in that at least the upper legs of said person abut against the seat support in use, wherein said person is moved along the track in a seated position, with his back parallel to the track.

Since the person has a position wherein his upper legs and his lower legs occupy a position which corresponds with a seated position, the total length of the person, seen in the direction of transport, is less than the length of said person in fully stretched position. This makes it possible to arrange the successive holders closer together than in the known device. Since both upper legs are furthermore supported by the seat support, skirt wearers in particular are protected against undesirable exposure.

One embodiment of the amusement device according to the invention is characterized in that said holder is furthermore provided with a hip securing device.

Said hip securing device provides an unequivocal fixation of a person in a direction parallel to and opposed to the direction of transport. The person is clamped between the seat support, the back support and the hip securing part, so that said person is unequivocally retained.

Another embodiment of the amusement device according to the invention is characterized in that said leg securing part comprises an adjustable knee securing part, which abuts at least against said person's knees in use.

A knee support is experienced as being relatively comfortable.

The position of a person's knees with respect to the seat support and the back support is determined by means of said knee securing part. With the amusement device according to the invention, the upper legs of the person are retained between the knee securing part and the seat support and/or the back support. At the same time, the lower legs are supported by the knee support.

Another object of the invention is to provide an amusement device which comprises a holder in which a person is secured in position in a simple and comfortable manner.

This objective is accomplished with the amusement device according to the invention in that said leg securing part comprises an adjustable knee securing part, which abuts against a person's knees in use, wherein said holder furthermore comprises a hip securing part.

It has become apparent that by securing a person's shoulders, hips and knees in with respect to the seat support and the back support, a person present in the holder is secured in position therein in a relatively adequate, simple and comfortable manner.

Another embodiment of the amusement device according to the invention is characterized in that said shoulder securing part, said hip securing part and said knee securing part are adjustable with respect to said seat support, wherein in use said person's seat is supported by said seat support.

Since the person is seated on the seat support, the adjustment of the three securing parts is relatively simple. As a result of the presence of the seat support, the position of the knees is known within relatively narrow bounds. The same applies to the hip position. With regard to the position of the shoulders, it applies that said position does not depend on the length of the person's legs, so that also the position of the shoulders will vary within relatively narrow bounds.

If a knee securing part is to be placed from a standing position, the height of the knees of different persons, that is, of a person about 1.20 m tall or of a relatively large grown-up having a length of 2.10 m, will vary within relatively wide bounds. The position of the shoulder part is not only determined by the length of the torso thereby, but also by the length of the legs.

Another embodiment of the amusement device according to the invention is characterized in that said shoulder securing part, said hip securing part and said knee securing part can be adjusted independently of each other.

Since the three securing parts, for the knees, the shoulders and the hip, are independently adjustable, the holder is suitable for persons of relatively widely varying dimensions.

BRIEF DESCRIPTION OF THE DRAWINGS

The invention will be explained in more detail with respect to the drawings, wherein.

Corresponding parts are indicated by the same numerals in the figures.

Figures 1A, 1B, 1C, 1D, 1E:
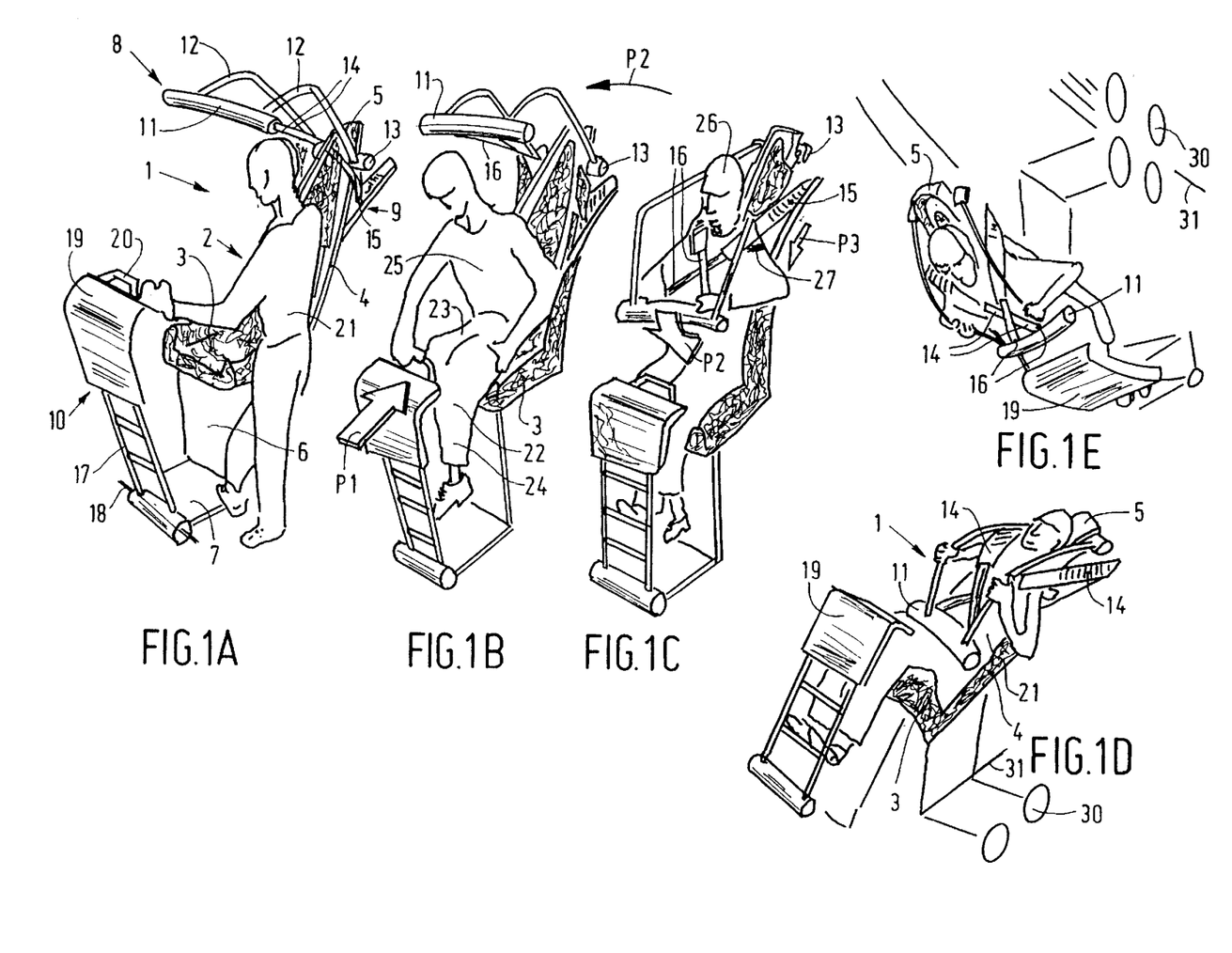
FIGS. 1A–1E are perspective views of a first embodiment of a holder according to the invention, showing said holder in various positions thereof.

FIGS 1A shows a holder 1 for a person, which forms part of a vehicle of an amusement device according to the invention. Holder 1 is provided with a seat 2, which comprises a seat support 3, a back support 4 adjacent thereto, and a head support 5 adjacent to said back support. Seat 2 is mounted on a frame 6, which furthermore comprises a footboard 7. Holder I furthermore comprises a hip securing part 8, a shoulder securing part 9 and a knee securing part 10.

Hip securing part 8 comprises a laterally extending bar 11, which is pivotally connected, by means of two pivoting arms 12 which are attached on either side thereof, to a laterally extending pivot pin 13, which is present near head support 5.

Shoulder securing part 9 comprises two belts 14, which are attached to either side of head support 5 with one end 15 and which are attached to hip bar 11 with second end 16. Belts 14 are thereby crossed, as can be seen in FIG. 1C, for example.

Knee securing part 10 comprises a ladder-like construction 17, which pivots with a first end about a laterally extending pivot pin 18, which is present near footboard 7.

Ladder-like construction 17 comprises a dish-like portion 19 on a side remote from pivot pin 18, and a handle 20 which is attached thereto.

The operation of holder 1 according to the invention is as follows. In the position of the securing parts 8, 9, 10 which is shown in FIG. 1A, a person can step onto footboard 7 and seat himself on seat support 3. If said person is relatively small, he may use the steps of ladder-like construction 17 thereby. Once person 21 has seated himself on the seat support, he takes hold of handle 20 and pulls knee securing part 10 in the direction indicated by arrow P1, until dish-like portion 19 abuts against his knees 22. The person's upper legs 23 are now retained between dish-like portion 19 of knee securing part 10, seat support 3 and back support 4. His lower legs 24 abut against dish-like portion 19 thereby. Then person 21 takes hold of hip bar 11 and pivots it about pivot pin 13 in the direction indicated by arrow P2, until hip bar 11 abuts against the person at the transition between said person's torso 25 and his upper legs 23. By moving hip bar 13 in the direction indicated by arrow P2, belts 14 are simultaneously moved over the person's head 26, and the portions of belts 14 which are present near head support 5 are placed against the shoulders 27 of person 21. Once hip bar 11 has reached its end position, the first ends 15 of belts 14 are moved in a direction indicated by arrow P3, until the belts abut firmly against the shoulders 27 of person 21 (see FIG 1C). At that moment, person 21 is firmly retained in holder 1, with his head 26 supported against head support 5, his back supported against back support 4, his upper legs retained between dish-like portion 19 of knee securing part 10, seat support 3 and back support 4, and his lower legs supported against dish-like portion 19.

After it has been verified whether the shoulder securing part, the hip securing part and the knee securing part correctly secure the person in position, which can be done manually or by means of sensors, dish-like portion 19, hip bar 11 and belts 14 are locked in the end positions that have been reached. It is possible thereby to use locking arrangements which are known per se. The belts 14 may be used in combination with modified belt pensioners which are known from the automobile industry, which can be attached to the first ends 15 of belts 14. The belt pensioners which are used in the amusement device must keep the belts permanently tensioned and locked.

FIG. 1D shows the eventual position of a person 21 who is secured in holder 1. Holder 1 forms part of a vehicle (not shown), which can be moved by means of wheel sets 30 over a guide construction 31 forming a track. Such a track construction is known per se and will not be explained in more detail, therefore. Holder 1 is suitable for moving a person in seated position over a track. In addition to that, holder 1 is excellently suited for moving a person in a position in which he hangs under guide construction 31, as is shown in FIG. 1E. After a person 21 has seated himself in holder 1, holder 1 with the person 21 retained therein is moved with respect to guide construction 31, in such a manner that the person comes to hang from the guide construction. In said hanging position, the total length of the person in the direction of transport is less than if said person would extend full length along the track, due to the fact that the person has pulled up his knees, as it were. As a result of this position, in which the persons are Z-shaped, as it were, the relative difference in length between tall and short persons in the direction of the track has been considerably reduced. Besides providing an adequate support for the person's seat, seat support 3 also protects said person against undesirable exposure. The manner in which the person is moved from a seated position on the track to a hanging position under the track forms part of another patent application of the applicant, and consequently it will be discussed only briefly herein with reference to FIGS. 6A–6D.

It is also possible to connect holder 1 to the guide construction near head support 5, whereby holder 1 can be moved to a position parallel to guide construction 31 in the manner indicated in WO 97/02878.

Figures 2A, 2B, 2C:
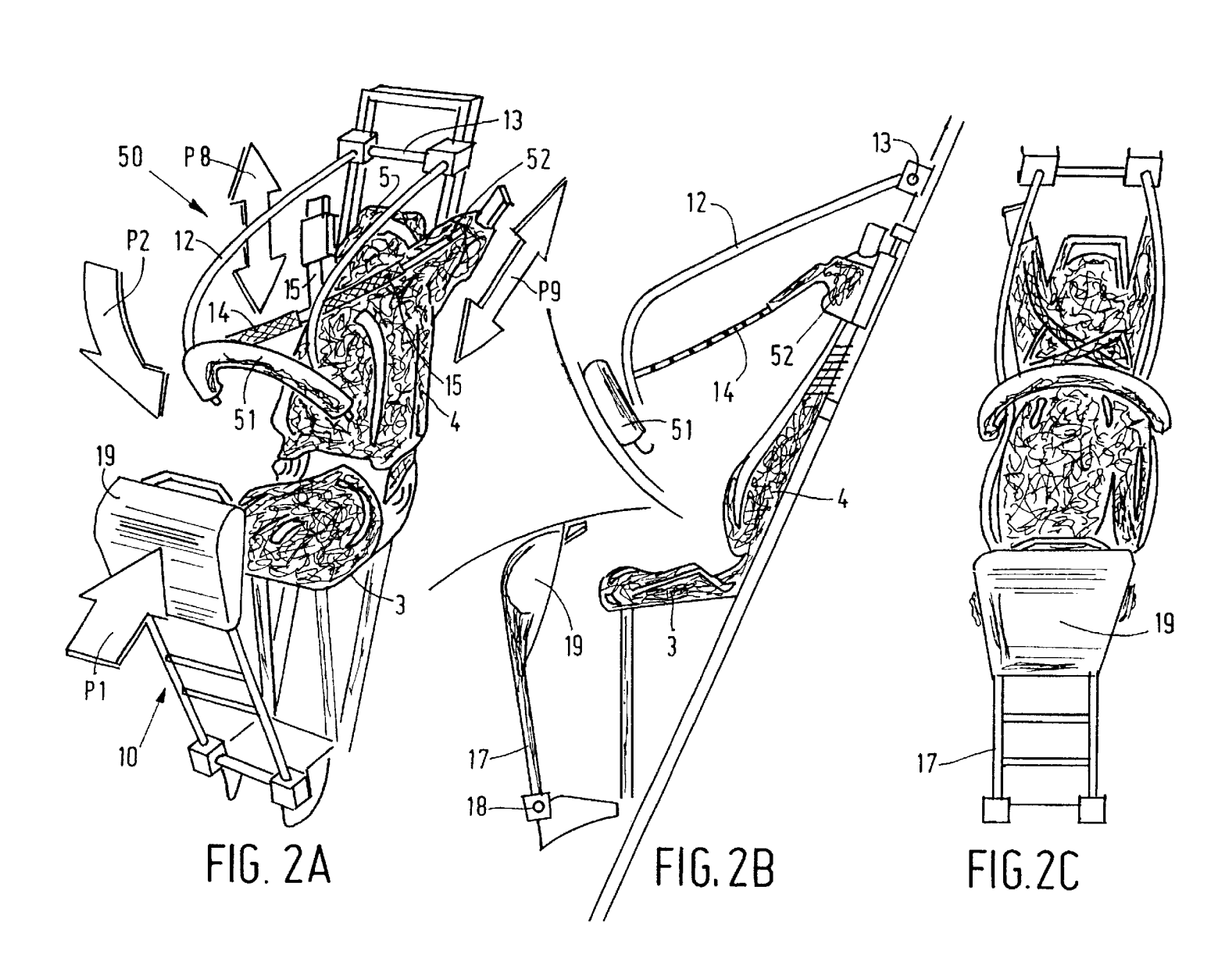
FIGS 2A–2C are a perspective view, a side view and a front view respectively of a second embodiment of a holder according to the invention.

FIGS. 2A–2C are a perspective view, a side view and a front view respectively of a second embodiment of a holder 50 according to the invention, which largely corresponds with the embodiment of FIGS. 1A–1E. With the holder 50 as shown in FIGS. 2A–2C, hip bar 51 is curved more than hip bar 11. Belts 14 are connected with a first end 15 to belt pensioners 52, which are movable in directions obliquely away from head support 5, as indicated by double arrows P8 and P9 respectively. For a description of the operation of the holder 50 which is shown in FIGS. 2A–2C, reference is made to the description of the operation of holder 1.

Figures 3A, 3B:
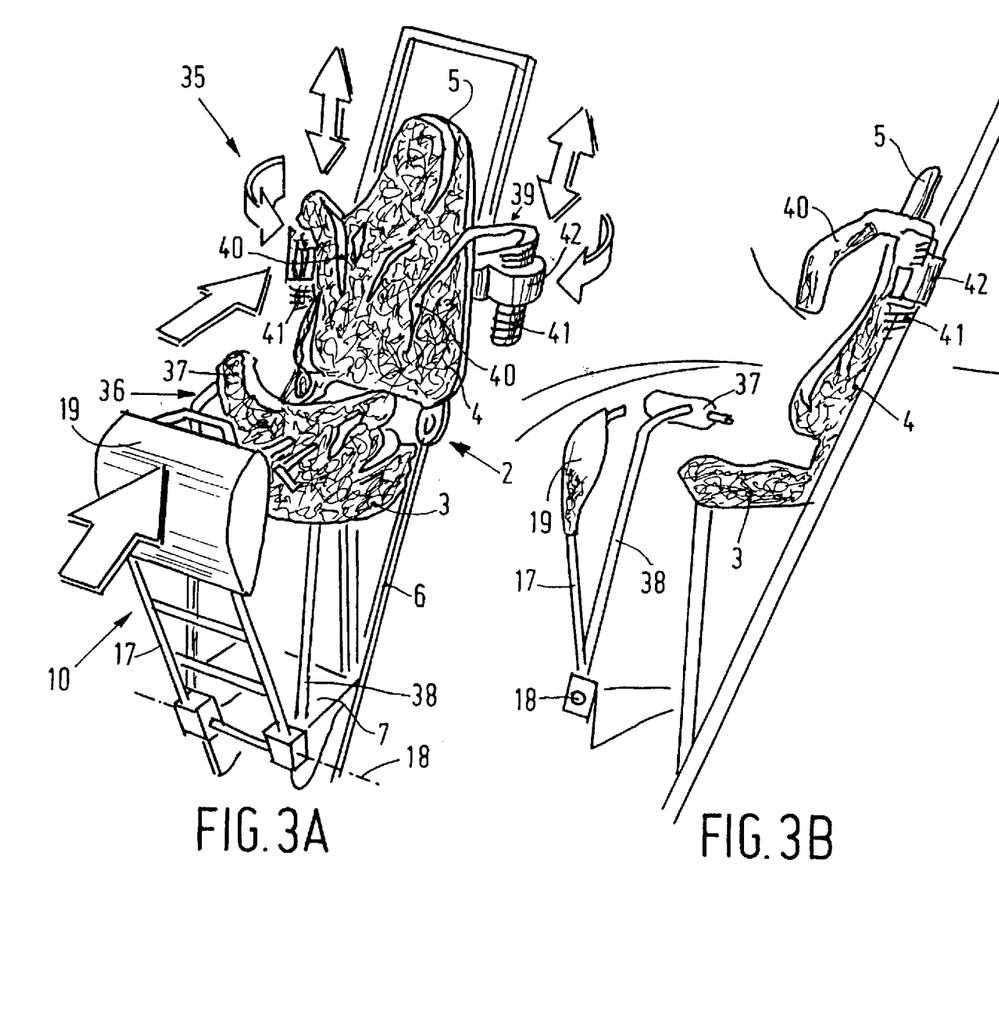
FIGS 3A–3C are a perspective view, a side view and a front view respectively of a holder according to a third embodiment of the invention.
Figure 3C:
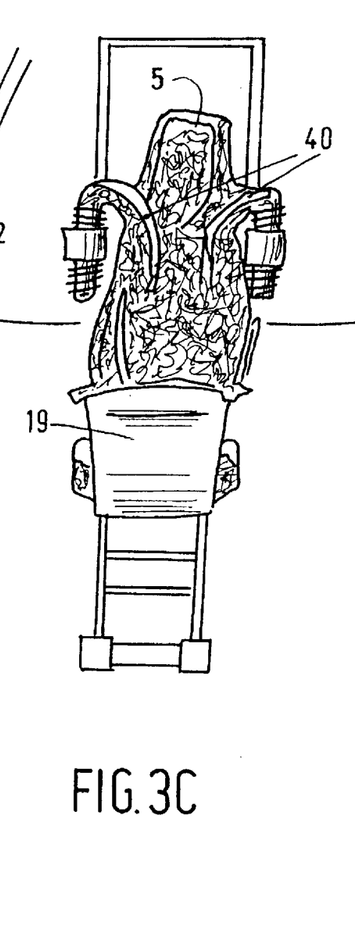

FIGS. 3A–3C are a perspective view, a side view and a front view respectively of a third embodiment of a holder 35 according to the invention. Holder 35 is provided with a seat 2, which comprises a seat support 3, a back support 4 adjacent thereto and a head support 5 adjacent to said back support. Seat 2 is mounted on a frame 6, which furthermore comprises a footboard 7. Holder 35 furthermore comprises a knee securing part 10 which corresponds with the knee securing part 10 as shown in FIGS. 1A–1E. Holder 35 furthermore comprises a hip securing part 36, which comprises a hip bar 37, which is pivotally connected, by means of two arms 38, to the laterally extending pivot pin 18, about which also ladder-like construction 17 of knee securing part 10 pivots.

Holder 35 is furthermore provided with a shoulder securing part 39, which comprises two shoulder bars 40 positioned on either side of head support 5, which each pivot on pivot pins 41 which extend in cranio-caudal direction. Pivot pins 41 are pivotally supported in supporting structures 42, which are movable in a direction substantially parallel to said cranio-caudal direction.

Figures 4A, 4B, 4C, 4D, 4E:
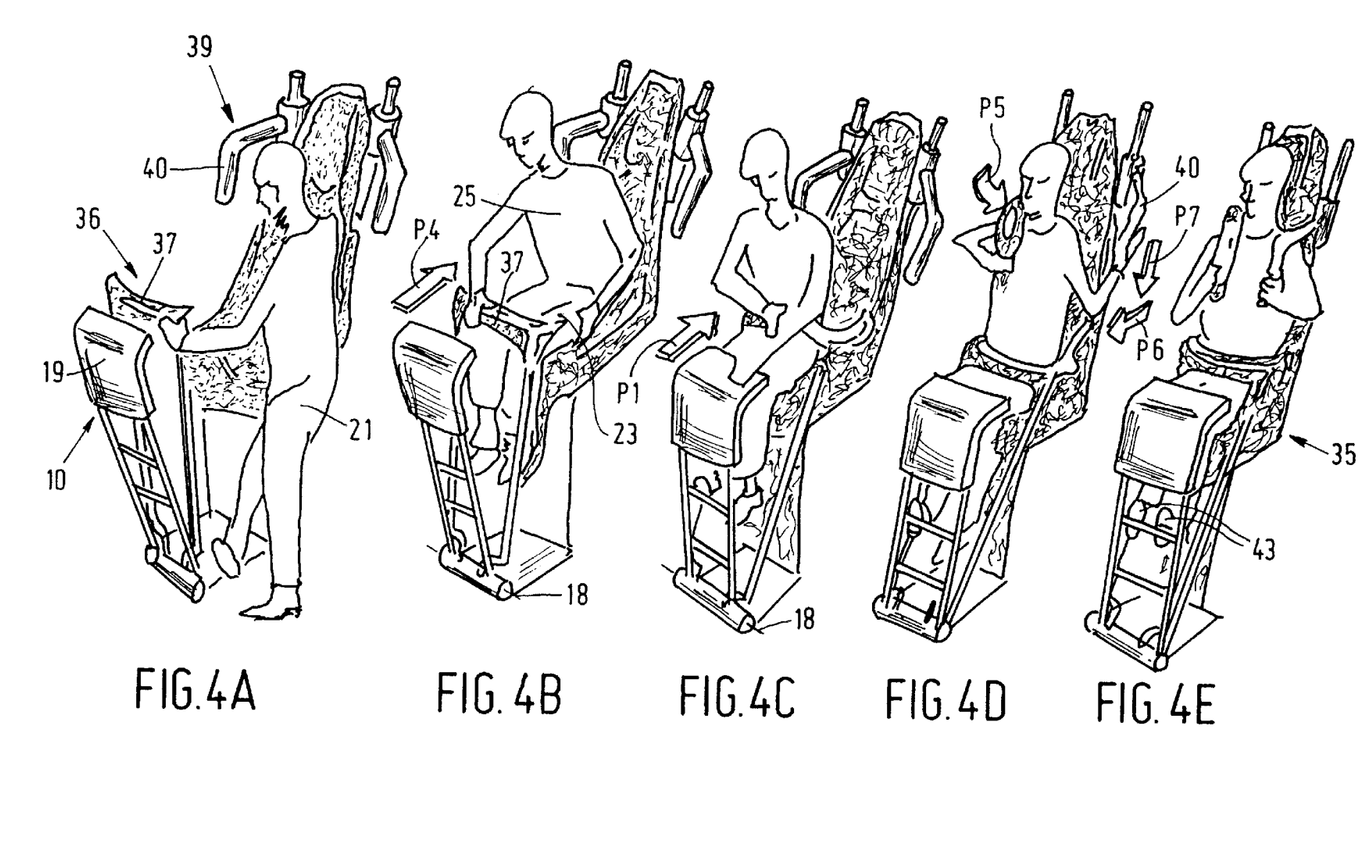
FIGS. 4A–4C are perspective views of the embodiment of FIG. 3 of the holder according to the invention, showing various stages of the boarding procedure.

FIGS. 4A–4E show the operation of the holder 35 of FIGS. 3A–3C. In the position of securing parts 10, 35, 39 as shown in FIG. 3A, a person 21 seats himself in seat 2. Then said person takes hold of hip bar 37 and pivots it about pivot pin 18 in the direction indicated by arrow P4 until said hip bar abuts against the transition between said persons' torso 25 and his upper legs 23 (FIG. 4B). Then person 21 pulls dish-like portion 19 of knee securing part 10 towards him, whereby said knee securing part 10 is pivoted in the direction indicated by arrow P1 (FIG. 4C). Then the person takes hold of shoulder bars 40, one by one, and pivots them in the direction indicated by arrows P5 and P6 respectively. At the same time, said person pulls bars 40 in the cranio-caudal direction as indicated by arrow P7, as a result of which shoulder bars 40 come to abut against the shoulders of person 21 (FIG. 4D). Then it is verified whether the shoulder securing part, the hip securing part and the knee securing part are correctly positioned, after which said securing parts are locked in their correct positions (FIG. 4E). Person 21 is comfortably and securely retained in holder 35 in a relatively simple manner thereby. The person's head is freely movable in lateral direction, so that an unobstructed view in all directions is possible. The person's feet can be comfortably placed against one of the steps of ladder-like construction 17, thus enabling the person to actively support himself while the holder is being moved over the guide structure forming the track. This is found to be pleasant.

Figure 5A:
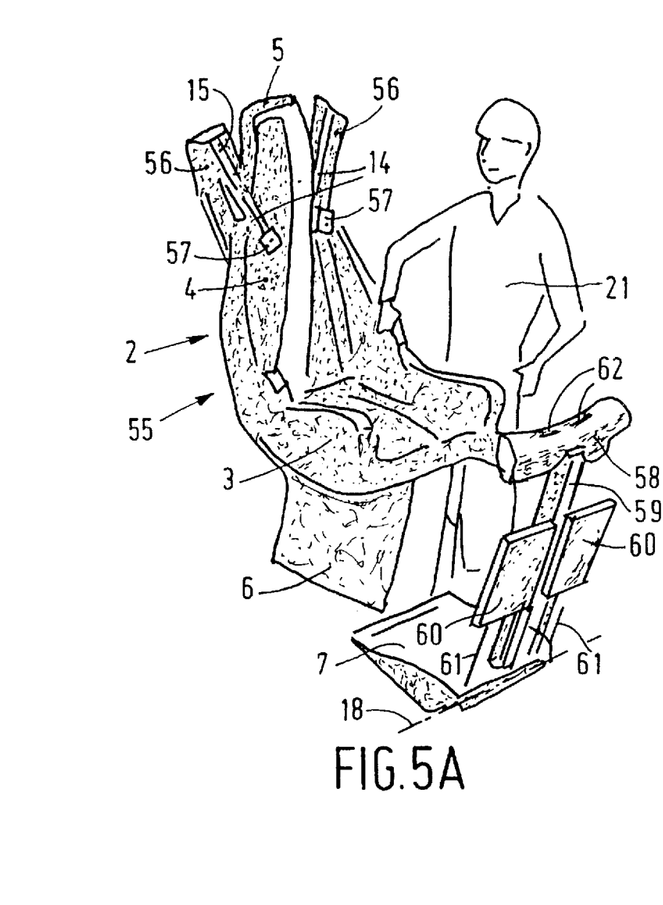
FIGS. 5A–5C are perspective views of a fourth embodiment of the invention, showing various positions thereof.
Figure 5B:
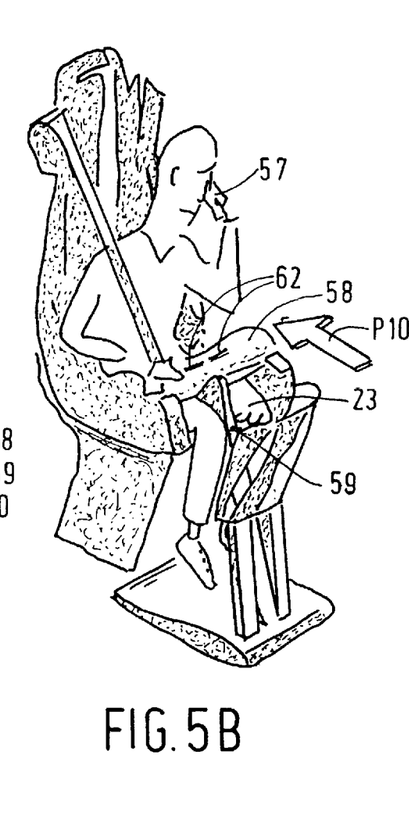
Figure 5C:
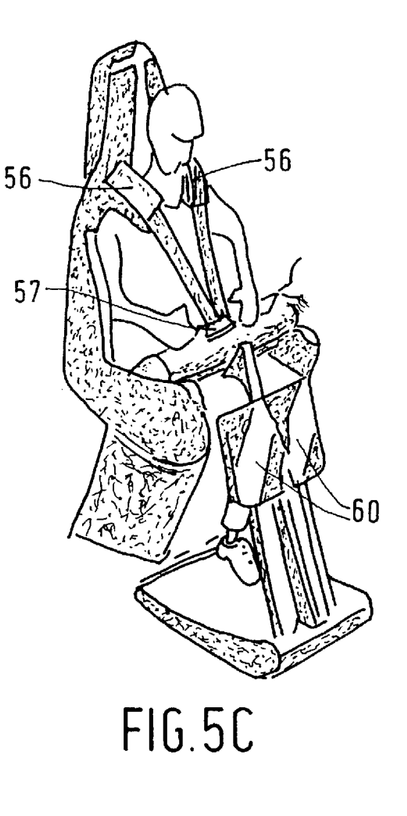

FIGS. 5A–5C are perspective views of various positions of a holder 55 according to the invention. Holder 55 is provided with a seat 2, which comprises shoulder cushions 56 on either side of head support 5, through which the ends 15 of belts 14 extend. The ends 15 of belts 14 are attached to a rear side of seat 2 by means of belt tensioners. The ends of belts 14 remote from ends 15 are provided with belt tongues 57.

Holder 55 is furthermore provided with a hip bar 58, which can be pivoted, by means of an arm 59, about a pivot pin 18 which is present near footboard 7. Knee supports 60 are provided on either side of arm 59, which knee supports can be pivoted about pivot pin 18 by means of arms 61. Hip bar 58 is provided with two belt tongue locking mechanisms 62.

The operation of holder 55 is as follows. A person 21 seats himself in seat 2 in the position of holder 55 which is shown in FIG. 5A. Then person 21 pulls hip bar 58 towards himself, whereby said hip bar is pivoted about pivot pin 18 in the direction indicated by arrow P10. Arm 59 is positioned between the upper legs 23 of said person thereby. Then said person takes hold of belt tongues 57 and inserts them into belt tongue locking mechanisms 62. Shoulder cushions 56 are bent, so that they will abut against said person's shoulders. This is shown in FIG. 5C. Then the knee supports 60 are automatically pivoted about pivot pin 18, until the tiltable knee supports 60 abut against the knees of person 21. Once the belt tongues have been locked in position in the belt tongue locking mechanisms, hip bar 58 has been locked and knee supports 60 have been placed and subsequently locked, person 21 is securely retained in holder 55, after which holder 55 can be moved over a guide construction forming a track, whereby said person may occupy a seated position on said track or a hanging position under said track.

Figure 6A:
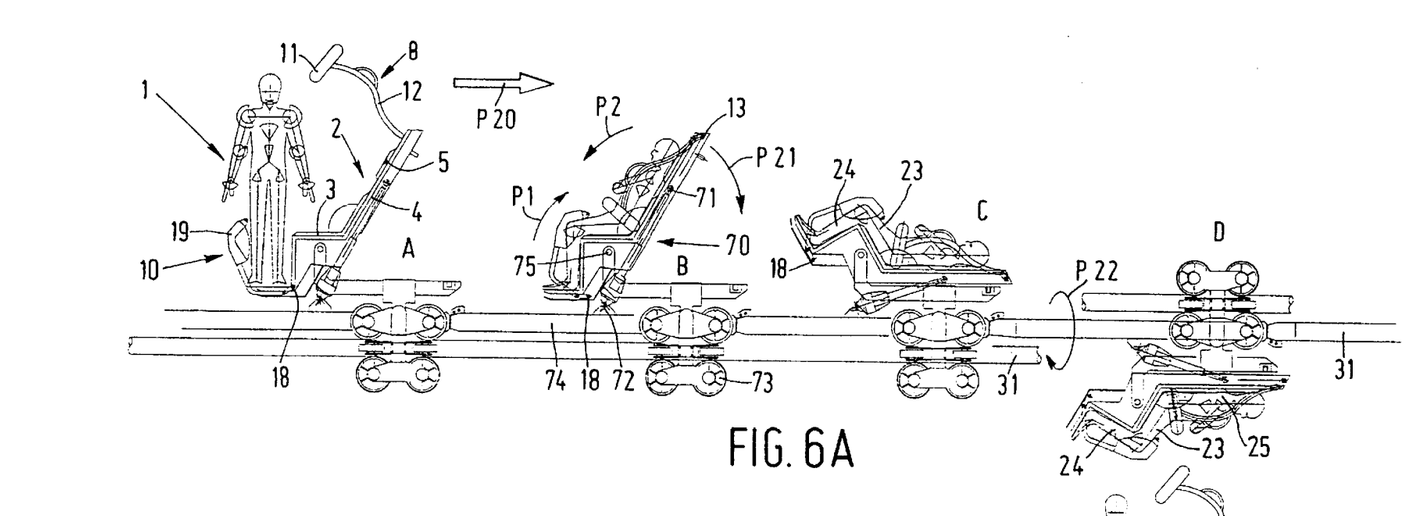
FIGS. 6A–6B show an amusement device according to the invention, which is provided with a holder according to the invention as shown in FIGS 1A–1E.
Figure 6B:
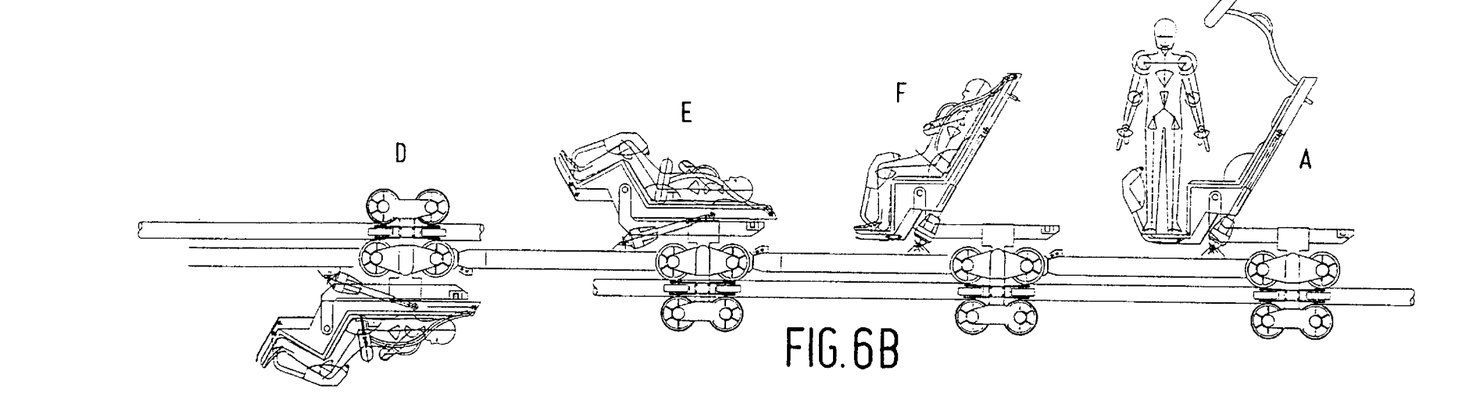

FIGS. 6A and 6B show the holder 1 of FIGS. 1A–1E is various positions A-F during boarding (positions A-D) and unboarding (positions D-E-F-A). In position A, the person seats himself in holder 1, after which hip securing part 8 and knee securing part 10 are pivoted in the direction indicated by arrows P2, P1 as discussed in great detail above with reference to FIGS. 1A–1E, and the holder takes up position B. Seat 2 is pivoted about pivot pin 75, in the direction indicated by arrow P21, to position C by means of a linear actuator 70, which is pivotally connected to seat 2 with one end 71 and to a chassis 74, which is provided with wheels 73, with another end 72. The person's back thereby extends parallel to guide construction 31 forming the track. Upper legs 23 and lower legs 24 are inclined at angles with respect to track 31, as a result of which the total length of holder 1 can be relatively limited. Holder 1 undergoes a rotation in a direction indicated by arrow P22 upon being moved in the direction of transport indicated by arrow P20, as a result of which holder 1 will be suspended from track 31. Subsequently, the holder is moved along track 31 in this position. At an unboarding station, the holder is successively moved from position D, via position E and position F to position A, from where the person can leave the amusement device.

We claim:

1. An amusement device comprising a guide construction forming a track, along which at least one vehicle is movable in a direction of transport, wherein the back of a person present in the vehicle extends substantially parallel to the track in use, said vehicle comprising a holder for said person, which at least comprises a seat support, a back support, a head support, an adjustable shoulder securing part and a leg securing part, characterized in that the holder is arranged so that at least the upper legs of said person abut against the seat support in use, wherein said person is moved along the track in a seated position.

2. An amusement device according to claim 1, characterized in that said holder furthermore comprises a hip securing part.

3. An amusement device according to claim 2, characterized in that said shoulder securing part, said hip securing part and said knee securing part are adjustable with respect to said seat support, wherein said person's seat is supported by said seat support in use.

4. An amusement device according to claim 3, characterized in that said shoulder securing part, said hip securing part and said knee securing part can be adjusted independently of each other.

5. An amusement device according to claim 1, characterized in that said leg securing part comprises an adjustable knee securing part, which abuts at least against said person's knees in use.

6. An amusement device according to claim 5, characterized in that said knee securing part pivots about a laterally extending pivot pin which is present near said person's feet.

7. An amusement device according to claim 1, characterized in that said holder can be tilted with respect to the track, to a position wherein the cranio-caudal direction of said person is parallel to the direction of transport.

8. An amusement device according to claim 1, characterized in that said shoulder securing part comprises two shoulder bars, which pivot about a pivot pin which extends substantially in cranio-caudal direction, and which are adjustable at least in cranio-caudal direction.

9. An amusement device comprising a guide construction forming a track, along which at least one vehicle, in which at least one person can be seated, is movable in a direction of transport said vehicle comprising a holder for said person, which at least comprises a seat support, a back support, a head support, an adjustable shoulder securing part and a leg securing part, characterized in that said leg securing part comprises an adjustable knee securing part, which abuts against a persons knees in use, wherein said holder furthermore comprise a hip securing part.

10. An amusement device comprising a guide construction forming a track along which at least one vehicle is movable in a direction of transport, wherein the back of a person present in the vehicle extends substantially parallel to the track in use, said vehicle comprising a holder for said person, which at least comprises a seat support, a back support, a head support, adjustable shoulder securing part and a leg securing part, characterized in that the holder is arranged so that at least the upper legs of said person abut against the seat support in user wherein said person is moved along the track in seated position and further wherein said leg securing part comprises an adjustable knee securing part, which abuts at least against said person's knees in use, and wherein said knee securing part furthermore comprises a lower leg support.

11. An amusement device comprising a guide construction forming a track, along which at least one vehicle is movable in a direction of transport, wherein the back of a person present in the vehicle extends substantially parallel to the track in use, said vehicle comprising a holder for said person, which at least comprises a seat support, a back support, a head support, an adjustable shoulder securing part and a leg securing part, characterized in that the holder is arranged so that at least the upper legs of said person abut against the seat support in use, wherein said person is moved along the track in a seated position, and further wherein said leg securing part comprises an adjustable knee securing part, which abuts at least against said person's knees in use, and wherein said knee securing part furthermore comprises a foot support.

12. An amusement device comprising a guide construction forming a track, along which at least one vehicle is movable in a direction of transport, wherein the back of a person present in the vehicle extends substantially parallel to the track in use, said vehicle comprising a holder for said person, which at least comprises a seat support, a back support, a head support, an adjustable shoulder securing part, a leg securing part, and a hip securing part, characterized in that the holder is arranged so that at least the upper legs of said person abut against the seat support in use, wherein said person is moved along the track in a seated position, wherein said hip securing part comprises a bar which extends laterally with respect to said person, which bar pivots with at least one arm about a pivot pin which is present near said head support.

13. An amusement device according to claim 12, characterized in that the pivot axis of the knee securing part coincides with the pivot axis of the hip securing part.

14. An amusement device comprising a guide construction forming a track, along which at least one vehicle is movable in a direction of transport, wherein the back of a person present in the vehicle extends substantially parallel to the track in use, said vehicle comprising a holder for said person, which at least comprises a seat support, a back support, a head support, an adjustable shoulder securing part, a leg securing part, and a hip securing part, characterized in that the holder is arranged so that at least the upper legs of said person abut against the seat support in use, wherein said person is moved along the track in a seated position, wherein said hip securing part comprises a bar which extends laterally with respect to said person, which bar pivots about a laterally extending pivot pin which is present near said person's feet.

15. An amusement device comprising a guide construction forming a track, along which at least one vehicle is movable in a direction of transport, wherein the back of a person present in the vehicle extends substantially parallel to the track in use, said vehicle comprising a holder for said person, which at least comprises a seat support, a back support, a head support, an adjustable shoulder securing part, a leg securing part, and a hip securing part, characterized in that the holder is arranged so that at least the upper legs of said person abut against the seat support in use, wherein said person is moved along the track in a seated position, and wherein said shoulder securing part comprises at least two belts which are each connected to said holder, near a shoulder, with a first end and which are connected to said hip securing part with a second end.

16. An amusement device according to claim 15, characterized in that the first ends of said belts are adjustable at least in cranio-caudal direction.

17. An amusement device according to claim 15, characterized in that said belts can be tensioned.

* * * * *